United States Patent
Riahi et al.

(10) Patent No.: US 10,133,486 B2
(45) Date of Patent: Nov. 20, 2018

(54) STATUS INDICATOR ON A DATA STORAGE DEVICE

(71) Applicant: SEAGATE TECHNOLOGY LLC, Cupertino, CA (US)

(72) Inventors: Aliasghar Riahi, Orinda, CA (US); Mike H. Miller, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 134 days.

(21) Appl. No.: 14/456,907

(22) Filed: Aug. 11, 2014

(65) Prior Publication Data
US 2016/0041768 A1 Feb. 11, 2016

(51) Int. Cl.
G06F 3/06 (2006.01)
G06F 21/00 (2013.01)
G06F 21/62 (2013.01)

(52) U.S. Cl.
CPC .......... *G06F 3/0608* (2013.01); *G06F 3/0652* (2013.01); *G06F 3/0673* (2013.01); *G06F 21/00* (2013.01); *G06F 21/6209* (2013.01); *G06F 2212/7205* (2013.01); *G06F 2221/2143* (2013.01)

(58) Field of Classification Search
CPC ....................... G06F 3/0652; G06F 2212/7205
See application file for complete search history.

(56) References Cited

U.S. PATENT DOCUMENTS

| | | | |
|---|---|---|---|
| 6,532,548 B1 * | 3/2003 | Hughes | G06F 11/1084 714/6.21 |
| 6,968,459 B1 | 11/2005 | Morgan et al. | |
| 7,139,027 B1 | 11/2006 | Fredlund et al. | |
| 8,296,545 B2 * | 10/2012 | Estakhri | G11C 16/20 711/170 |
| 9,116,905 B1 * | 8/2015 | Harwood | G06F 11/3476 |
| 9,430,330 B1 | 8/2016 | Bardhan | |
| 2004/0257878 A1 * | 12/2004 | Morikawa | G11C 16/0475 365/185.28 |
| 2005/0038566 A1 | 2/2005 | Chian | |

(Continued)

OTHER PUBLICATIONS

Wilson, M. "Western Digital My Passport Studio Drives, Now With E-Paper," http://gizmodo.com/5482721/western-digital-my-passport-studio-drives-now-with-e-paper), Mar. 1, 2010 (4 pp.).

*Primary Examiner* — Charles Rones
*Assistant Examiner* — Tian-Pong Chang
(74) *Attorney, Agent, or Firm* — Holland & Hart LLP (57) ABSTRACT

Methods, systems, and devices are described for displaying information on a visual display of a data storage device. The device may be an internal data storage device and may display information associated with various operation parameters or states of the data storage device. The data storage device may display, on the visual display, an indication that a data storage medium of the data storage device has been securely erased. The data storage medium may be securely erased by erasing an encryption key used to encrypt data stored on the data storage medium. The visual display may be electronic paper, mechanical, or chemical such that the information is displayed without power being applied to the data storage device.

15 Claims, 5 Drawing Sheets

(56) References Cited

U.S. PATENT DOCUMENTS

| | | |
|---|---|---|
| 2006/0075182 A1* | 4/2006 | Hsieh .................... G06F 3/0605 |
| | | 711/100 |
| 2006/0227123 A1 | 10/2006 | Bychkov et al. |
| 2007/0003270 A1* | 1/2007 | Fredlund .................. G09G 3/16 |
| | | 396/284 |
| 2007/0101058 A1* | 5/2007 | Kinnan ................. G06F 3/0605 |
| | | 711/114 |
| 2008/0155262 A1 | 6/2008 | Beaver et al. |
| 2008/0229420 A1 | 9/2008 | Jeschke et al. |
| 2009/0213698 A1 | 8/2009 | Ostrovsky et al. |
| 2009/0228823 A1 | 9/2009 | Edwards et al. |
| 2010/0082890 A1* | 4/2010 | Heo .................... G06F 12/0246 |
| | | 711/103 |
| 2010/0318810 A1 | 12/2010 | Strom et al. |
| 2012/0011409 A1* | 1/2012 | Resnick ................... G11C 7/04 |
| | | 714/718 |
| 2012/0185413 A1* | 7/2012 | Felter ................. G06Q 30/0283 |
| | | 705/400 |
| 2012/0278564 A1 | 11/2012 | Goss et al. |
| 2012/0281159 A1* | 11/2012 | Chen .................... G02F 1/1345 |
| | | 349/40 |
| 2013/0086394 A1* | 4/2013 | Shimmitsu ............. G06F 3/061 |
| | | 713/193 |
| 2013/0187791 A1* | 7/2013 | Marcus ................... H04Q 9/00 |
| | | 340/870.07 |
| 2014/0019812 A1 | 1/2014 | Saito |
| 2015/0169231 A1 | 6/2015 | Kanigicherla et al. |
| 2016/0034226 A1* | 2/2016 | Nakaso ............. G06F 11/1441 |
| | | 714/6.11 |

* cited by examiner

STATUS INDICATOR ON A DATA STORAGE DEVICE

SUMMARY

The present disclosure provides one or more improved systems, methods, and/or apparatuses for providing a status indicator on a data storage device. In some examples, a storage device may be equipped with a visual display to show one or more status indicator(s). The storage device may be an internal storage device configured to be mounted inside a host computing system, e.g., a personal computer, laptop, server, etc. The data storage device may include hardware, software, firmware, or otherwise be configured to control the information displayed on the status indicator. In some examples, the display may be electronic paper ("e-paper") where the information is displayed without power being applied to the data storage device (e.g., when unplugged from the host computing system). The data storage device may determine whether a data storage medium of the data storage device has been securely erased and display an indication on the status indicator accordingly. The data storage medium may also be configured to display on the status indicator additional information associated with various operations conditions or states of the data storage device.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present disclosure generally relates to a visual display on a data storage device. In accordance with various embodiments, a storage device is provided with a visual display and configured to control the information being displayed. In some aspects of the present disclosure, the data storage device includes logic (e.g., firmware) that monitors one or more statuses associated with the data storage device and provides a visual indication of the statuses. As one example, the data storage device may include encryption protocols that encrypt/decrypt data being stored/retrieved, respectively, on a storage medium of the data storage device. The data storage device may be configured to securely erase the stored data by erasing or overwriting an encryption key used to secure the data, for example. The data storage device may be configured to control the information displayed on the visual indicator to convey confirmation or an indication that the data storage device has been securely erased. The display may be e-paper, for example, such that the visual indicator may convey the confirmation regardless of whether power is applied to the data storage device. Accordingly, an operator may determine whether the data storage device is secured based on the displayed information.

Various examples described herein are made in reference to solid state drives (SSD), which generally include non-volatile solid-state memory, which may exhibit faster data transfer performance than a traditional hard disk drive (HDD) having rotating magnetic media. Such devices can be used as standalone replacement for an HDD and/or as a cache for an HDD. One difference between, e.g., an SSD and an HDD, is that the memory cells of an SSD have a finite life, measured as a function of number of erase/write cycles applied the memory cells. While an HDD may also exhibit wear (e.g., mechanical wear) that limits life of the device, the magnetic disks that are used as data storage media are not considered to be life-limited based on the number of erase/write cycles applied. It is to be understood, however, that the present disclosure is not limited to a SSD having a visual display and, instead, the visual display may be incorporated into a traditional HDD in accordance with various embodiments. In some embodiments, the data storage device is an internal drive configured to be mounted inside a host computing system.

Figure 1:
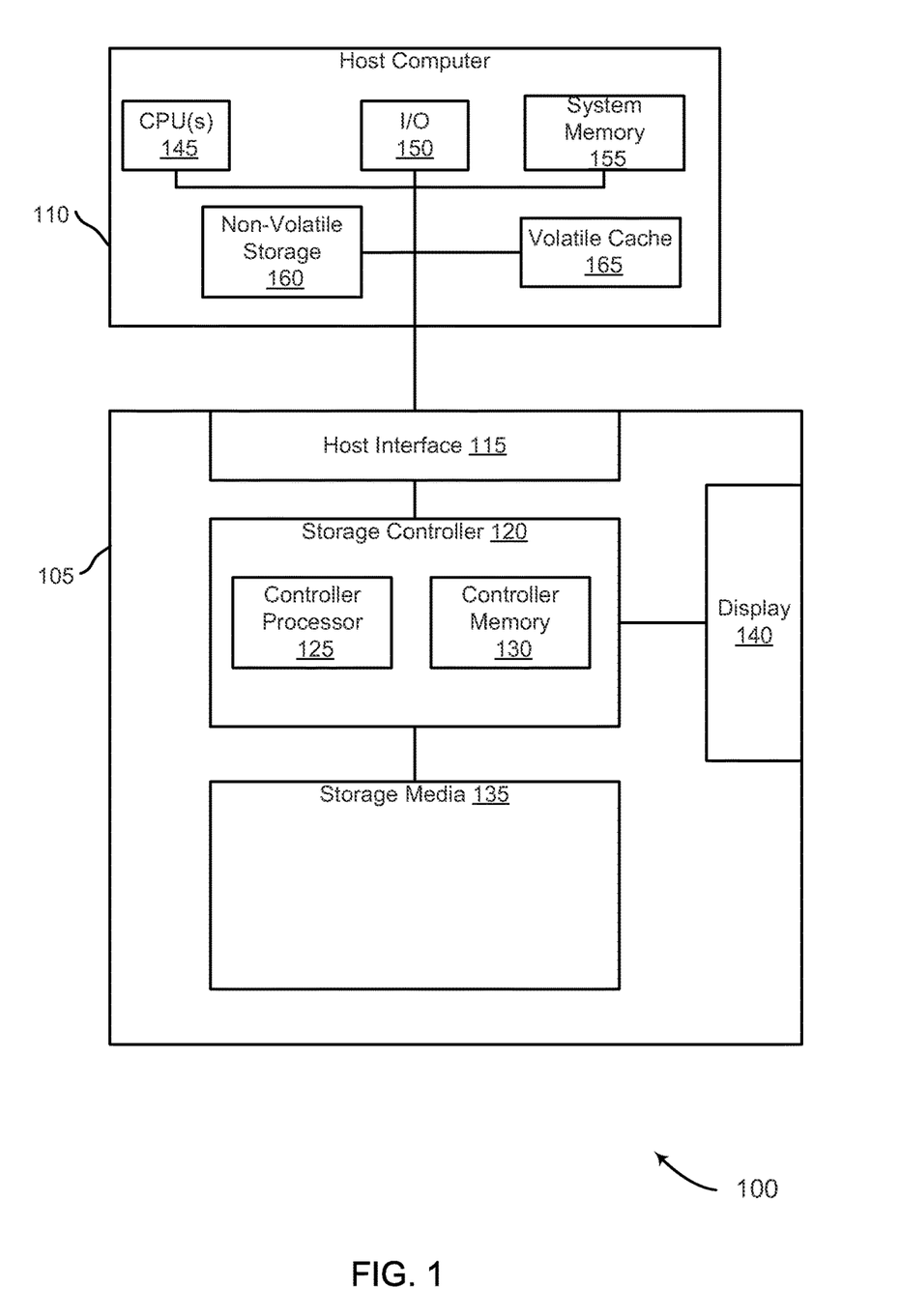
FIG. 1 is a block diagram representation of an example data storage device and host computer configured and operated in accordance with various embodiments.

With reference now to FIG. 1, a block diagram illustrates a system 100 having a non-volatile solid-state memory apparatus 105 (such as an SSD) according to various examples of the present disclosure. The example apparatus 105 is configured as an SSD, in which data from host computer 110 is received at the apparatus 105, encrypted, and stored. The apparatus 105 may be any type of persistent solid-state storage device, including an SSD, thumb drive, memory card, embedded device storage, etc. As discussed, the apparatus 105 may also be a traditional HDD. The apparatus 100 may include a host interface 115 that facilitates communications between the apparatus 105 and the host computer 110.

The apparatus 105 of this example includes one or more storage controllers 120, which may include a controller processor 125, which may be a general-purpose or special-purpose processor that performs operations of the apparatus 105. The storage controller 120 may include any combination of microprocessors, digital signal processor (DSPs), application specific integrated circuits (ASICs), field programmable gate arrays (FPGAs), or other equivalent integrated or discrete logic circuitry suitable for performing the various functions described herein. The controller processor 125 may be in communication with a controller memory 130, which may store computer readable code that may be executed by the controller processor 125 to perform various operations of the apparatus 105. In some examples, as will be described in more detail below, the controller memory 130 includes non-volatile memory that may store a portion of an encryption key used to encrypt data stored in storage media 135.

The apparatus 105 may also include a display 140 in communication with the storage controller 120. The display 140 may be a static display in that the information may be displayed without power applied. In some examples, the display 140 may be an electronic paper or electronic ink (commonly referred to as "e-paper") display. The display 140 may be a black and white display or a color display. The display 140 may be flat and/or curved. In some examples, the display 140 is positioned on the outside of a SSD and/or a HDD and placed in a location to be readily visible when viewing the SSD/HDD.

In some examples, the display 140 is positioned on an internal SSD/HDD, i.e., a storage device that is mounted inside a host computing system during normal use. As would be appreciated, the display 140 mounted internally may not be visible during daily use. However, aspects of the storage controller 120 may monitor various conditions associated with the apparatus 105, e.g., secure erase status, sensor(s) status, error conditions, life cycle, etc., and cause information associated with the monitored condition to be displayed on the display 140. Accordingly, a technician removing the apparatus 105 from the computing system (also removing power) may view the display 140 to determine the various conditions. As one example, the technician may immediately know if the storage media 135 has been securely erased using an instant secure erase (ISE) function, discussed in more detail below.

In some examples, the display 140 may be a mechanical display that may convey a visual indication of the various parameters associated with the apparatus 105. As one example, the visual display 140 may be a fuse, a circuit breaker, a switch, and the like. The storage controller 120 may be configured to output information to the display 140 to activate at least a portion of the mechanical display based on operational aspects of the apparatus 105. For example, the storage controller 120 may send a signal to the display 140 to blow the fuse or change the position of a switch when the storage media 135 has been securely erased. In some embodiments, the mechanical display may be usable once, e.g., a traditional fuse, or may be reusable, e.g., a switch or an electronic fuse that can be reset and reused for a subsequent secure erasure.

As another example, the display 140 may be a chemical display where an electrically activated chemical indicator that maintains its state in the absence of power is used to visually indicate the status of various aspects of the data storage device.

Additional functions that may be provided by the storage controller 120 include, for example, functions related to storage and retrieval of data to/from the storage media 135. Such functions may include, for example, address translation/mapping, caching, wear-leveling operations, and encryption/decryption operations. Such functions may be implemented using any combination of hardware, software, and/or firmware. As mentioned above, storage controller 120 includes controller memory 130, which may include non-volatile memory, and which may also include volatile random access memory (RAM). The RAM may be used, among other things, to cache data read from or written to storage media 135, map logical to physical addresses, and store other operational data used by the controller processor 125 and other components of the apparatus 105.

The host computer 110 may also include a number of components, including one or more central processing units (CPUs) 145, input/output circuitry 150, and system memory 155. The host computer 110 may use the apparatus 105 as a lowest level of persistent storage, or the apparatus 105 may be acting as an intermediate level of cache for another layer of non-volatile storage (e.g., hard disk drive). The host computer 110 and apparatus 105 may be commonly coupled to a power supply (not shown), or may include separate power supplies/sources. Host computer 110 also includes non-volatile storage 160, and volatile cache 165 which may be used, for example, to store data as needed by the host computer 110. In some examples, the display functions of the apparatus 105 are configured to operate independently from the host computer 110, as is described in more detail below.

Figure 2:
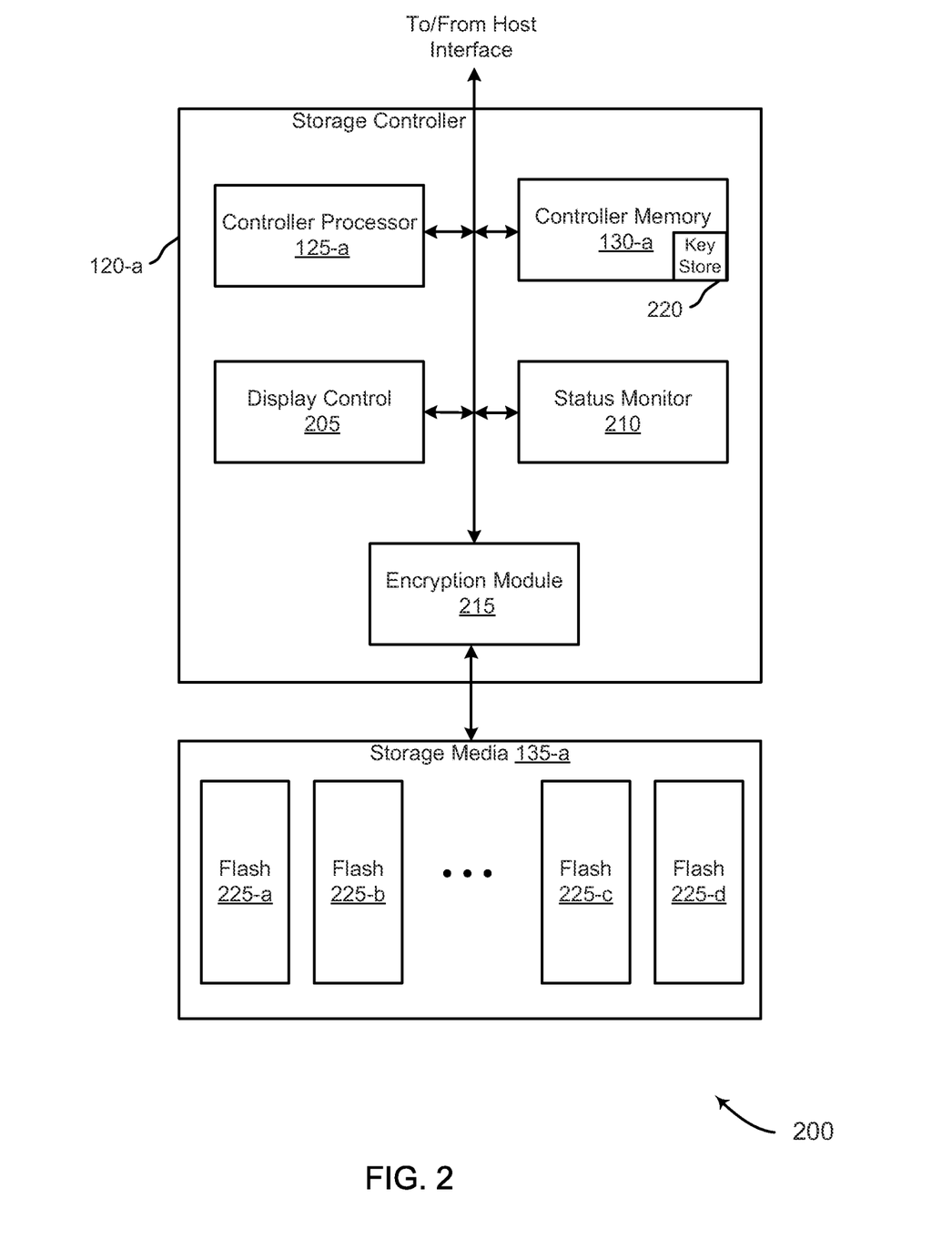
FIG. 2 is a block diagram representation of an example of a storage controller and storage media in accordance with various embodiments.

With reference now to FIG. 2, an example 200 of a storage controller 120-$a$ and storage media 130-$a$ is discussed. The storage controller 120-$a$ and storage media 130-$a$ may be examples of the storage controller 120 and storage media 130 of FIG. 1, for example. In this example, the storage controller 120-$a$ may include controller processor 125-$a$, controller memory 130-$a$, a display control 205, a status monitor 210, and an encryption module 215. Each of the noted modules may be a means for performing one or more functions related to operation of the storage device. In some examples, each of the noted modules may be combined with the controller processor 125-$a$ as one or more functional elements or sub-components.

The storage media 130-$a$, in some examples, may include non-volatile solid-state storage, such as one or more flash dies 225, which individually contain a portion of the total storage capacity of the apparatus 105. The memory contained within individual flash dies 225 may be further partitioned into blocks which may be referred to as erasure blocks/units. The erasure blocks represent the smallest individually erasable portions of the storage media 130-$a$. The erasure blocks in turn include a number of pages that represent the smallest portion of data that can be individually programmed and/or read. In a NAND configuration, for example, the page sizes may range from 512 bytes to 4 kilobytes (KB) and up, and the erasure block sizes may range from 16 KB to 512 KB and up. It will be appreciated that the present embodiments described herein are not limited to any particular size of the pages and blocks.

The display control 205 may operate or otherwise control one or more aspects of the information being displayed on the visual display of the data storage device. In some examples, the display control 205 may communicate with the controller processor 125-$a$, the controller memory 130-$a$, the status monitor 210, and/or the encryption module 215 to receive information associated with various aspects of the data storage device. Accordingly, the display control 205 may send one or more signals to the visual display to set, change, update, or otherwise cause information indicative of the aspects of the data storage device to be displayed. In some examples, the display control 205 may cause the display to show the various aspects in real-time, i.e., as the information is received from the noted components, or to be updated on a periodic schedule. When the visual display is a mechanical display, the display control 205 may send one or more signals to cause the physical components of the mechanical display to change.

The status monitor 210 may include, or communicate with, one or more components of the data storage device to determine and output information associated with the data storage device. In some examples, the status monitor 210 may output information indicative of an operational state of the data storage device. An operational state may include, but is not limited to, a workload status, a sensor status, an error condition, an operating hours status, a temperature status, and the like. Accordingly, the visual display of the operational state of the data storage medium may provide for improved and more convenient operation and maintenance activities associated with the data storage device.

As discussed above, in various embodiments, data may be encrypted by encryption module 215 using one or more encryption keys stored in a key store 220 in controller memory 130-*a* before being stored in storage media 135-*a*. Additionally or alternatively, key store 220 may be included in storage media 135-*a*.

Figure 3:
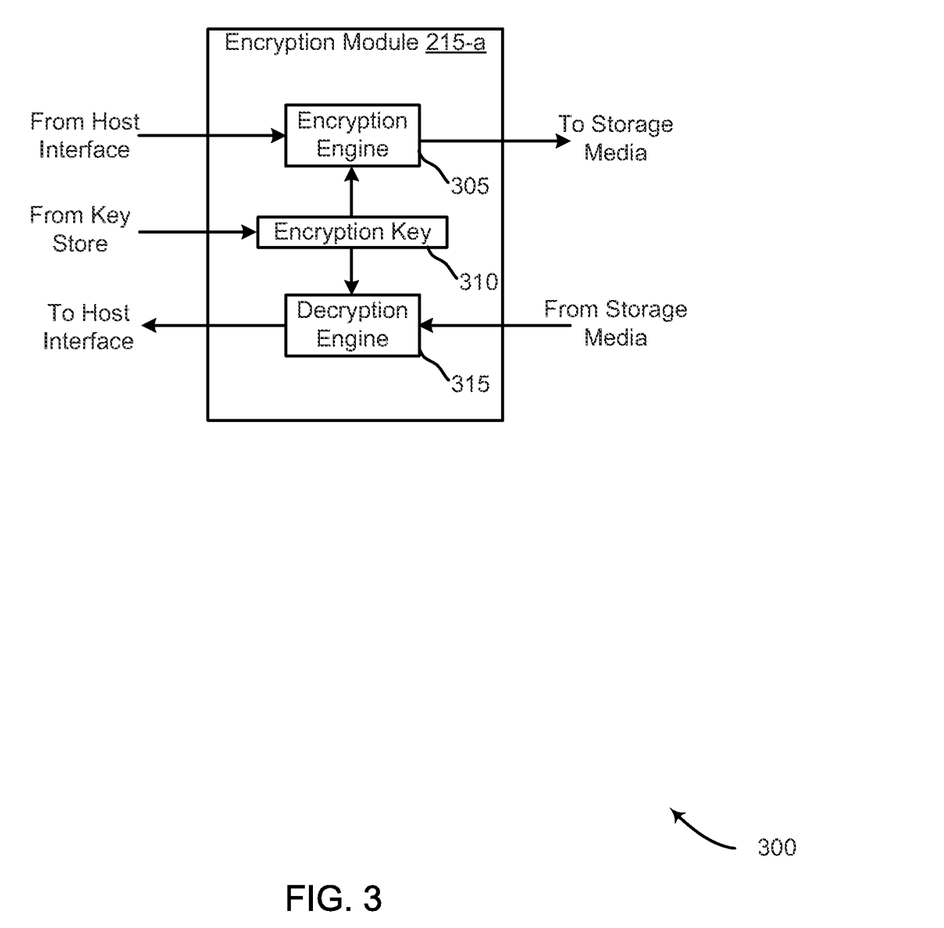
FIG. 3 is a block diagram representation of an encryption module in accordance with various embodiments.

With reference now to FIG. 3, a block diagram 300 illustrates an example of an encryption module 215-*a* according to various embodiments. Encryption module 215-*a* may be an example of encryption module 215 of FIG. 2, for example. The encryption module 215-*a* receives data from the host interface at encryption engine 305, and uses an encryption key 310 to perform an encryption algorithm on the data and output encrypted data to be stored in storage media. Likewise, decryption engine 315 may be used to decrypt data from the storage media and provide decrypted data to the host interface. Each of the noted modules/engines may be a means for performing one or more functions related to operation of the storage device.

Encryption key 310 may be formed from a root key, according to various embodiments. The root key may be stored in a re-writable storage location. Such a configuration for the encryption key 310 may be desirable because certain security standards, including the current version of the FIPS 140 standards, require methods to zeroize cryptographic keys that operate from within the boundaries of a cryptographic module. Methods for zeroizing may require the cryptographic key to be modifiable or erasable. In some examples, the root key may be stored in a one-time writable memory location that, when zeroized, overwritten, erased, etc., it may no longer be possible to store/retrieve encrypted data using the storage apparatus. Accordingly, in some examples, the encryption key 310 may be a modifiable or erasable root key and may be encrypted with an alterable root key.

In various examples, the encryption key 310 may be erased or otherwise modified to provide for an instant and secure erasure of the information being stored on the storage medium. That is, the encrypted data stored on the data storage medium may only be recoverable via decryption using the encryption key 310. Erasing the encryption key 310 or otherwise making it unavailable for use would prevent the stored data from being decrypted and, therefore being readable. Thus, the storage controller, for example, may securely erase the data or information stored on the storage medium by erasing the encryption key 310. Even if the stored information were recovered, it would be unreadable without the original encryption key 310. This technique may provide for an instantaneous method of securely erasing the data, rather than the more traditional and lengthy method of overwriting each memory block of the data storage medium.

Figure 4:
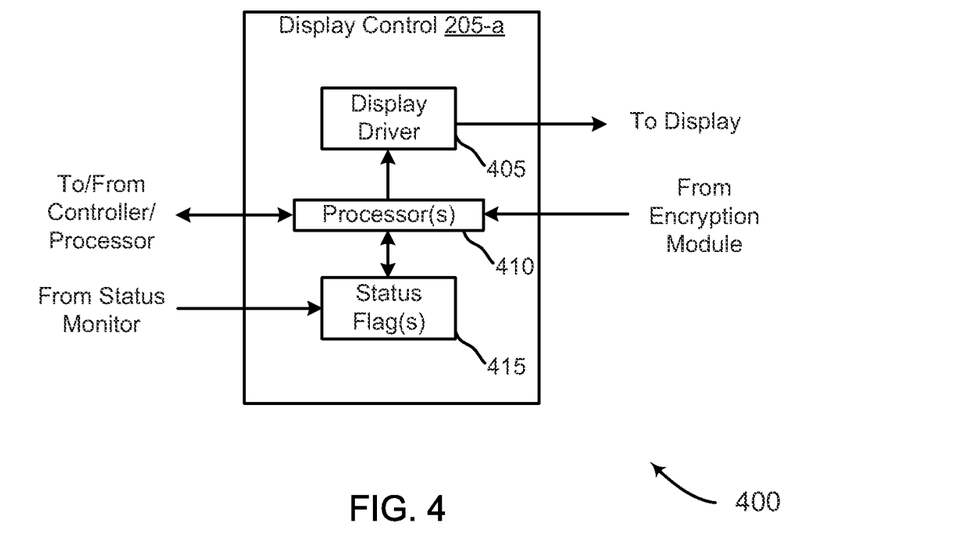
FIG. 4 is a block diagram representation of a display control in accordance with various embodiments.

With reference now to FIG. 4, a block diagram 400 illustrates an example of a display control 205-*a*. The display control 205-*a* may be an example of the display control 205 of FIG. 2, for example. In this example, display control 205-*a* includes a display driver 405, one or more processors 410, and a status flag 415. Each of these components may be in communication with the other via a bus, for example.

The display driver 405 may communicate with the processor(s) 410 and the visual display of the data storage device. As discussed above, the visual display may be e-paper where the information continues to be displayed once power is removed from the data storage device. In other examples, the visual display may be a mechanical display, e.g., a fuse or a switch, or a chemical display. The display driver 405 may receive information, commands, etc., from the processor 410 and output signal(s) to the visual display to cause the visual display to convey a visual indication based on the information received from the processor(s) 410.

The status flag(s) 415 may communicate with the processor(s) 410 and the status monitor. As is discussed on more detail below with reference to FIG. 5, the status monitor may output information associated with various parameters or operational conditions/states associated with the data storage device. The status flag(s) 415 may receive signal(s) from the status monitor indicative of such parameters or conditions and output information to the processor(s) 410 to convey the parameters or conditions.

The processor(s) 410 may communicate with the other components of the display control 205-*a* as well as the controller processor and the encryption module of the data storage device, e.g., the controller processor 125 and the encryption module 215 discussed above. In some examples, aspects of the processor 410 may be implemented as a functional component of the controller processor. The processor 410 may receive information, data, control signals, etc., and output signals to the display driver 405 based on the received information, data, and the like. In some examples, the processor 410 may also output time information to be displayed on the visual display. As one example, the processor 410 may determine when an event occurs, e.g., the data storage medium is securely erased, and output information indicative of the event date (day, month, year), time, etc., to be displayed on the visual display. Accordingly, a technician may view the display and immediately determine whether the data storage medium has been securely erased and also when the drive was securely erased.

In some examples, the processor 410 may reset or update the information displayed when additional information is written to the data storage medium. That is, the visual display may convey an indication that the data storage medium was securely erased based on information received from the controller processor and/or the encryption module, for example. When data is subsequently saved to the data storage medium of the data storage device, the processor 410 may receive a signal from the encryption module as a part of the encryption/storage functions discussed above. Accordingly, the processor 410 may output a signal to the display driver 405 to cause the display to remove the indication that the data storage medium has been securely erased.

In some examples, the processor 410 may output information to cause the visual display to show a unique number associated with the data storage medium. Displaying the unique number may provide for a secondary security measure (along with the display showing that the data storage medium has been securely erased) to confirm that the data storage medium has been securely erased. The unique number may be, in some examples, associated with a number located on a label or tag affixed on the enclosure of the data storage device. In other examples, the unique number may only be retrievable from a manufacturer as a step in the confirmation process that the data storage medium has been securely erased.

In some examples, the processor 410 may output information to cause the visual display to show a number that can be matched to a number previously written to the drive by the host computing system prior to the secure erase operation. The number may be stored in the controller memory 130 and/or the storage media 135 and communicated to the processor 410 during a secure erase operation. After the data storage medium has been securely erased, the data storage device may be placed into service again with additional data being encrypted and stored on the storage medium. In the subsequent use, a new number may be provided by the host computing system and displayed on the visual display once the data storage medium is securely erased a second time. Thus, this may provide for a visual indication of the secure erasure status of the drive and permit multiple reuse/secure-erase cycles.

It is to be understood that the components discussed above may be implemented as one or more components, in hardware, software, firmware, etc., of the apparatus 105. As one example, the controller memory 130 and/or the storage medium 135 may store firmware instructions that when executed by the controller processor 125 may independently control the information being displayed on the visual display. Accordingly, the information displayed on the visual display may be controlled autonomously, e.g., without input or control, from the host computing system. The autonomous operation and control of the displayed information may provide, for example, a security mechanism to prevent incorrect information being displayed on the visual display. Consequently, a confidence level may be ascribed to the displayed information to meet various security standards, warranty compliance, etc.

Figure 5:
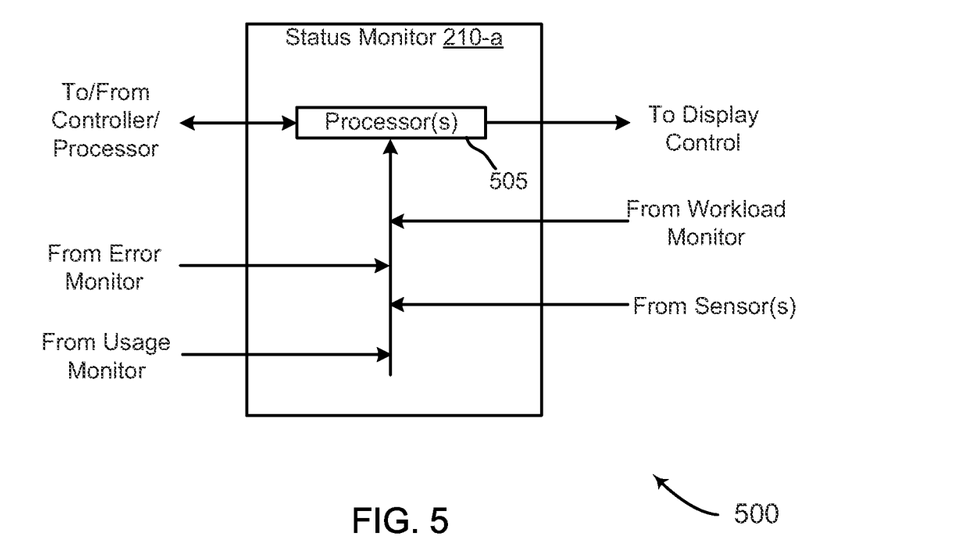
FIG. 5 is a block diagram representation of a status monitor in accordance with various embodiments.

FIG. 5 illustrates a block diagram 500 of an example of a status monitor 210-*a*. The status monitor 210-*a* may be an example of a status monitor 210 of FIG. 2 and may include one or more processor(s) 505. The processor 505 may communicate with, for example, the controller processor, the display control, error monitor, usage monitor, workload monitor, and one or more sensors associated with the data storage device. The noted inputs may provide for a visual indication of data storage device related information such as, but not limited to workload information. The workload information may include information indicative of how much workload the drive has been exposed to. The workload information may, for example, provide information associated with whether the data storage device is close to its warranty limit or has passed its warranty. As one example, the workload information may be provided using self-monitoring, analysis and reporting (SMART) logging technology.

The error monitor input may include, but is not limited to, a motion sensor input. The error monitor input may provide an indication of the shock and vibration induced to the data storage device. Other error monitor inputs that may also be considered are read errors, write errors, seek errors, a healthy or failed status for individual platters and heads, and the like. The sensor input may include information associated with one or more sensors of the data storage device. Exemplary sensors may include a temperature sensor, a humidity sensor, shock and vibration sensors, and the like.

The usage input may include information associated with the use of the data storage device. For example, usage input may include information indicative of a state of wear-out of the data storage device relative to its expected end of life. This may be useful for a SSD, for example, where the storage medium supports a finite number of write/erase cycles. This information may also be helpful for other storage mediums, e.g., HDD, that has limits either on the number of write operations or the number of read operations that can be supported. Other usage input information may include the number of power-on hours of use of the data storage device, the revision level of the microcode on the data storage device, and the like.

Generally, the above described inputs may be utilized to reduce the maintenance and the support time of a data storage device. The processor 505 may receive the inputs and output information, or an index associated with the information, to the display control to cause the visual display to show the appropriate information.

Figure 6:
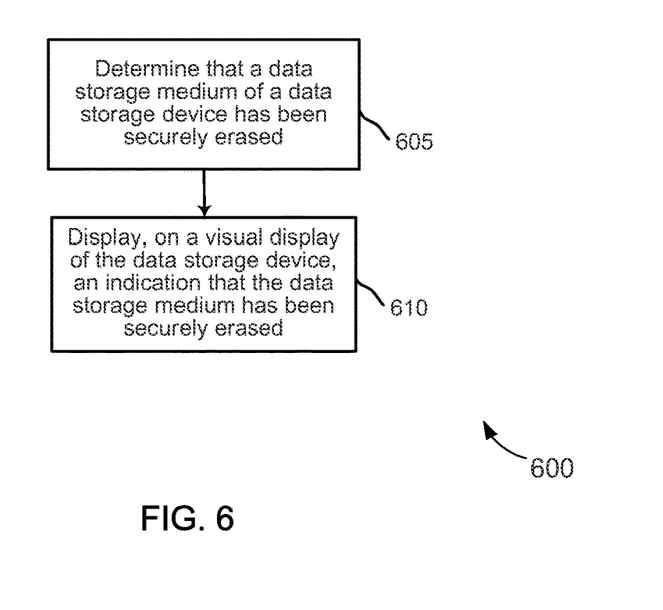
FIG. 6 is a flowchart illustration of the operational steps of a method for providing a visual indication on a data storage device in accordance with various embodiments.

FIG. 6 is a flowchart of a method 600 for displaying a secure erasure status on a data storage device according to various embodiments. For clarity, the method 600 is described below with reference to aspects of one or more of the data storage apparatus 105, storage controller 120, controller processor 125, and/or other components described with reference to FIGS. 1, 2, 3, 4, and/or 5. In one implementation, a storage controller 120, or a processor module thereof, may execute one or more sets of codes to control the functional elements of the device to perform the functions described below.

At block 605, the device may determine that a data storage medium of a data storage device has been securely erased. The device may determine that the data storage medium has been securely erased by determining whether an encryption key has been erased. At block 610, the device may display, in a visual display of the data storage device, an indication that the data storage medium has been securely erased. For example, the device may display "ISE" to indicate that the data storage medium has been securely erased using an instant secure erase procedure where the encryption key is erased. Additionally or alternatively, the device may display one or more numbers associated with the data storage device as a security component of the ISE procedure.

Figure 7:
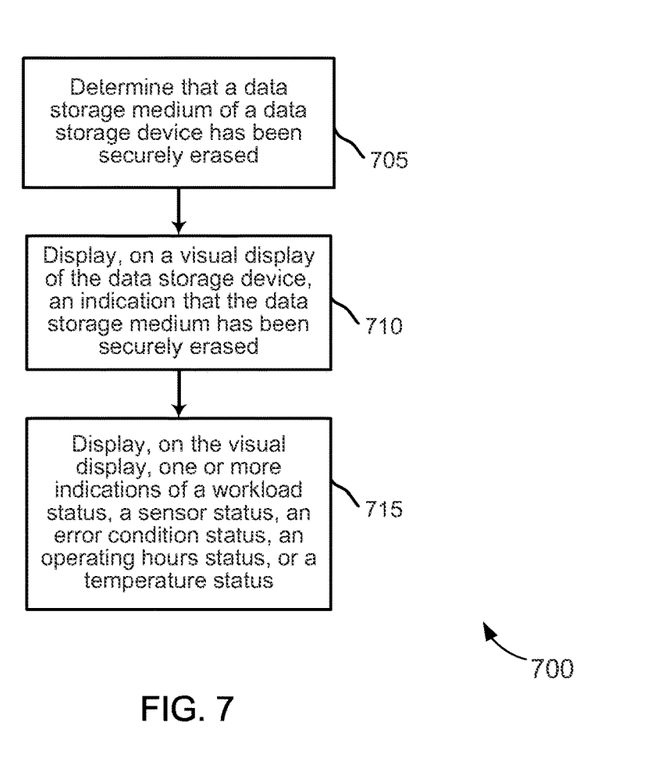
FIG. 7 is a flowchart illustration of the operational steps of a method for providing a visual indication on a data storage device in accordance with various embodiments.

FIG. 7 is a flowchart of a method 700 for displaying information on a data storage device according to various embodiments. For clarity, the method 700 is described below with reference to aspects of one or more of the data storage apparatus 105, storage controller 120, controller processor 125, and/or any other components described with reference to FIGS. 1, 2, 3, 4, and/or 5. In one implementation, a storage controller 120, or a processor module thereof, may execute one or more sets of codes to control the functional elements of the device to perform the functions described below.

At block 705, the device may determine that a data storage medium of a data storage device has been securely erased. The device may determine that the data storage medium has been securely erased by determining whether an encryption key has been erased. At block 710, the device may display, in a visual display of the data storage device, an indication that the data storage medium has been securely erased. For example, the device may display "ISE" to indicate that the data storage medium has been securely erased using an instant secure erase procedure where the encryption key is erased. Additionally or alternatively, the device may display one or more numbers associated with the data storage device as a security component of the ISE procedure.

At block 715, the device may display, on the visual display, one or more indications of a workload status, a sensor status, an error condition status, an operating hours status, or a temperature status. The additional displayed information may provide an indication of past and/or current operational conditions and/or states of the data storage device. The additional displayed information may provide input for various maintenance and/or warranty features associated with the data storage device.

The foregoing description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method, comprising;
generating a confirmation code;
affixing the confirmation code to an enclosure of a data storage device;
determining that a data storage medium of the data storage device has been securely erased;
displaying, on a visual display of the data storage device, an indication that the data storage medium has been securely erased, the indication including a unique code matching a code associated only with the data storage device and no other data storage device, the code indicating the data storage medium is securely erased;
confirming that the data storage medium is securely erased upon determining the confirmation code affixed to the enclosure matches at least a portion of the unique code displayed on the visual display;
detecting a removal of an operating voltage from the data storage device;
continuing to display the indication that the data storage medium is securely erased after the removal of the operating voltage;
detecting data being saved to the data storage medium after determining the data storage device has been securely erased; and
removing the indication from the visual display that the data storage medium has been securely erased upon detecting the data being saved to the data storage medium.

2. The method of claim 1, wherein determining that the data storage medium has been securely erased comprises:
determining that an encryption key securing data stored on the data storage medium has been erased.

3. The method of claim 1, wherein the indications displayed on the visual display are controlled by firmware instructions stored on the data storage medium and executed by the data storage device.

4. The method of claim 3, wherein the firmware instructions are executed by a processor of the data storage device.

5. The method of claim 1, wherein the visual display is an electronic-paper display.

6. The method of claim 1, further comprising:
displaying, on the visual display, one or more indications of a workload status, a sensor status, an error condition status, an operating hours status, or a temperature status.

7. The method of claim 1, further comprising:
displaying, on the visual display, an indication of when the data storage medium was securely erased.

8. The method of claim 1, wherein the visual display is a mechanical display operative to display information indicating that the data storage medium has been securely erased.

9. An apparatus, comprising:
a data storage device configured to be mounted within a processing system, the data storage device comprising:
a confirmation code affixed to an enclosure of the data storage device;
a data storage medium configured to store data;
a visual display configured to display information associated with the data storage device, wherein the data storage device is configured to display an indication that the data storage medium is securely erased, the indication including a unique code matching a code associated only with the data storage device and no other data storage device, the code indicating the data storage medium is securely erased;

a processor configured to:
   cause the indication to be displayed on the visual display upon determining the data storage medium is securely erased;
   confirm that the data storage medium is securely erased based at least in part on a determination the confirmation code affixed to the enclosure matches at least a portion of the unique code displayed on the visual display;
   detect a removal of an operating voltage from the data storage device, the visual display being configured to continue to display the indication that the data storage medium is securely erased after the removal of the operating voltage;
   detect data being saved to the data storage medium after determining the data storage device has been securely erased; and
   remove the indication from the visual display that the data storage medium has been securely erased upon detecting the data being saved to the data storage medium.

10. The apparatus of claim 9, wherein the data storage device is configured to determine that an encryption key securing data stored on the data storage medium has been erased to determine that the data storage medium has been securely erased.

11. The apparatus of claim 9, wherein the data storage device further comprises:
   the processor executing firmware instructions stored on the data storage medium to control the information being displayed on the visual display.

12. The apparatus of claim 9, wherein the visual display is an electronic-paper display configured to display the information associated with the data storage device.

13. The apparatus of claim 9, wherein the information associated with the data storage device displayed on the visual display comprises one or more indications of a workload status, a sensor status, an error condition status, an operating hours status, or a temperature status.

14. An apparatus, comprising:
   a data storage device comprising:
      a confirmation code affixed to an enclosure of the data storage device;
      a data storage medium configured to store data;
      a visual display configured to display an indication that the data storage medium has been securely erased, the indication including a unique code matching a code associated only with the data storage device and no other data storage device, the code indicating the data storage medium is securely erased;
      a processor configured to:
         cause the indication to be displayed on the visual display upon determining the data storage medium is securely erased;
         confirm that the data storage medium is securely erased based at least in part on a determination the confirmation code affixed to the enclosure matches at least a portion of the unique code displayed on the visual display;
         detect a removal of an operating voltage from the data storage device, the visual display being configured to continue to display the indication that the data storage medium is securely erased after the removal of the operating voltage;
         detect data being saved to the data storage medium after determining the data storage device has been securely erased; and
         remove the indication from the visual display that the data storage medium has been securely erased upon detecting the data being saved to the data storage medium.

15. The apparatus of claim 14, wherein the data storage device is configured to erase an encryption key to securely erase the data storage medium.

* * * * *